United States Patent [19]

Chen et al.

[11] 4,416,144
[45] Nov. 22, 1983

[54] APPARATUS FOR EVALUATING SLIDER FLYING DYNAMICS

[75] Inventors: Tsu F. Chen, Dresher; Juan M. Gottschalk, Elkins Park, both of Pa.

[73] Assignee: Sperry Corporation, New York, N.Y.

[21] Appl. No.: 370,448

[22] Filed: Apr. 21, 1982

[51] Int. Cl.³ .................. G01M 19/00; G01N 3/30; G01N 19/00
[52] U.S. Cl. .................. 73/12; 73/150 R; 73/432 R
[58] Field of Search .............. 73/12, 78, 79, 81, 82, 73/83, 85, 150 R, 432 V

[56] References Cited

U.S. PATENT DOCUMENTS 2,853,875  9/1958  Alderuccio et al. ............ 73/150
3,460,841  8/1969  Caldwell ..................... 73/432 V

OTHER PUBLICATIONS

T. F. Chen/Impact Wear of Thin NiCo Film on Magnetic Recording Disk/IEEE Transactions on Magnetics, vol. MAG-17, No. 6, Nov. 1981.

*Primary Examiner*—S. Clement Swisher
*Attorney, Agent, or Firm*—James R. Bell; Marshall M. Truex

[57] ABSTRACT

Apparatus is provided for imposing measurable wear on the surface of a magnetic recording disk and for determining the relationship of read/write characteristics due to such wear. A dynamic air bearing separates the interface between the disk surface and a slider head. The imposed wear changes the relationship between the head and disk and the changes provide measurable data for experimental evaluation of read/write slider flying dynamics.

17 Claims, 14 Drawing Figures

4,416,144

APPARATUS FOR EVALUATING SLIDER FLYING DYNAMICS

BACKGROUND OF THE INVENTION

1. Field of the Invention

This invention relates generally to electricity, measuring and testing and more particularly to magnetic information storage element testing.

2. Description of the Prior Art

A new generation of magnetic recording disk memory for computers uses plated or sputtered magnetic films as thin as 0.08 microns thick. Contrasting to the relatively softer disk surface, the associated recording head slider uses hard ceramic material. Spacing as close as 0.2 to 0.4 microns between the slider and disk is maintained by an aerodynamic bearing generated in the spacing at a disk surface speed of about 50 meters per second. The proper operation of the magnetic recording depends critically on the integrity of the interface which consists of the thin magnetic film, the slider surface and the dynamic air bearing. Wear of the film can occur due to contact between the slider and disk. The wear may be due to start/stop contact, in some types of recorders, or may be due to contacts caused by unwanted influences such as vibrations. The wear resulting from the impact of the slider on the disk surface must be controlled to the amount equal to or preferably less than one-half of the roughness of the disk surface.

At present, slider/disk interface wear is evaluated by a method in which the disk drive is used to accumulate the contact start-stop and/or seek motion cycles while the magnetic recording performance is monitored. This is a sound and complete test; however, it is costly, time consuming and provides limited understanding about the wear mechanisms which are required to meet the challenge of controlling the ever increasing sensitivity to wear of the head/disk interface.

The foregoing illustrates limitations of the known prior art. Thus, it is apparent that it would be advantageous to provide an alternative directed to overcoming one or more of the limitations as set forth above. Accordingly, a suitable alternative is to provide apparatus for measuring and characterizing slider/disk wear.

SUMMARY OF THE INVENTION

In one aspect of the present invention, this is accomplished by providing an apparatus for evaluating slider flying dynamics including a disk drive having a memory disk sample, a slider, a hammer for engaging the disk and creating dents therein and appropriate control circuits.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
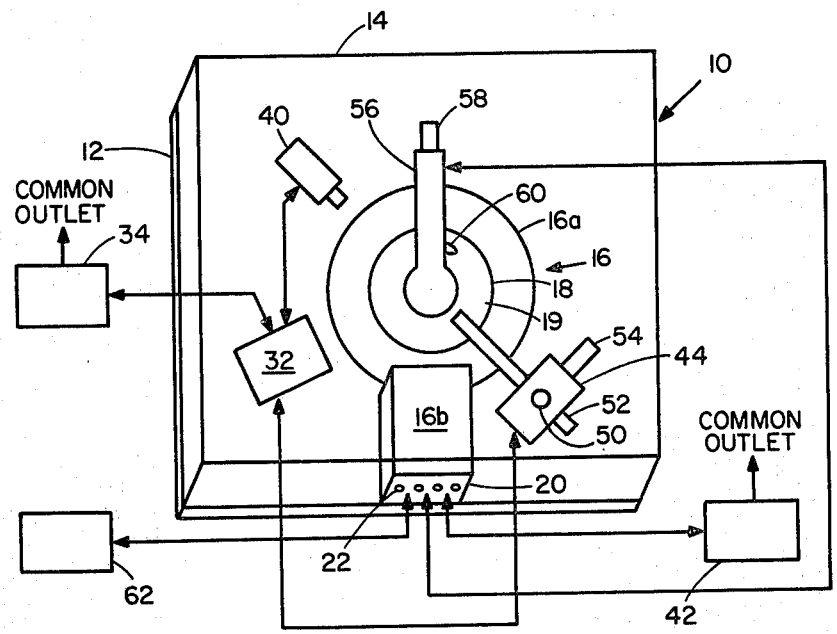
FIG. 1 is a graphical view illustrating an embodiment of the apparatus of this invention.
Figure 2:
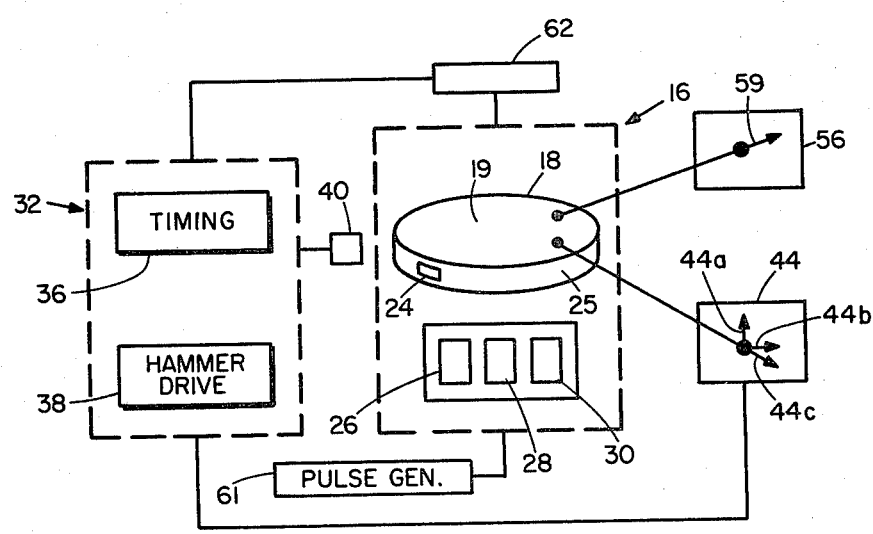
FIG. 2 is another view further illustrating an embodiment of the apparatus of this invention.

Referring to FIGS. 1 and 2, the apparatus 10 of this invention generally includes a base 12 which is preferably a rectangular aluminum plate for reducing magnetic interference. A cover 14 is provided for reducing contamination from airborne particles and is formed from transparent sheets of a commercially available, suitable synthetic material.

A disk drive 16 includes a portion 16a for retaining a disk sample 18, with a reflective marker 24 on an edge 25, to be tested and includes a control portion 16b. A face 20 of control portion 16b is exposed in an opening 22 in cover 14. Disk drive 16 is preferably a commercially available model 3700 airborne memory module manufactured by Sperry Flight Systems Division. Disk sample 18 is a working disk for use with disk drive 16 and comprises a 10 cm diameter memory disk with 0.08 micron thickness recording medium (N1-Co-P) and 12.5 micron thick substrate (N1-P) plated on a 0.5 cm thick aluminum disk. The disk is rotated at speeds up to 6000 rpm. It should be noted here that any desired disk sample can be provided for test purposes which may include portions of magnetic recording disks, developmental disks and commercially available disks of various types either plated, sputtered or coated. All such disks have in common a magnetic coating medium which is extremely thin and difficult to test. Control portion 16b includes a disk drive circuit 26, a read/write/erase circuit 28, and a write frequency and current control circuit 30. A power supply 42 is provided between a common outlet and control portion 16b to provide 400 Hz to disk drive circuit 26 and to provide DC voltage to read/write/erase circuit 28.

A supplementary circuit module 32 is provided and is powered by a readily available power supply 34. Module 32 is of known construction and provides a timing circuit 36 and a hammer drive circuit 38.

A suitable photo cell 40 is coupled to module 32. Cell 40 reads marker 24 on disk sample 18 and a resultant pulse is processed through the timing and hammer drive circuits 36, 38 respectively, to pick the right instant to drive a hammer (to be discussed later) to strike a predetermined spot on a surface 19 of disk sample 18 and form a dent therein. Hammer drive circuit 38 also provides options to strike either single or multiple impacts and is capable of adjusting delays of the strikes.

Figure 3:
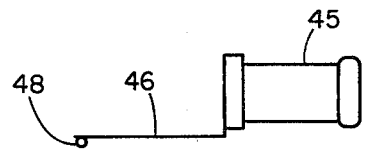
FIG. 3 is a graphical view illustrating an embodiment of the hammer of this invention.
Figure 4:
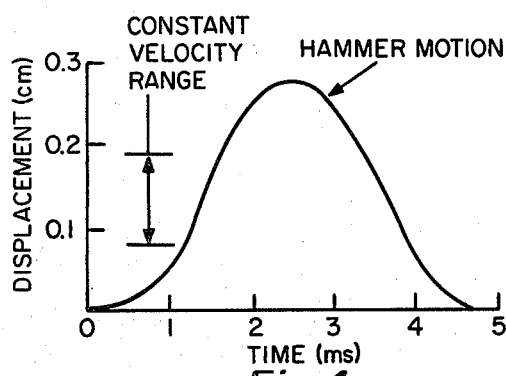
FIG. 4 is a graphic illustration of the hammer displacement.

A hammer assembly 44 is connected to module 32 and is preferably constructed of aluminum to reduce magnetic interference and includes three 0 to 1 inch micrometers 50, 52, 54. A cantilever beam hammer 46, FIG. 3, is of beryllium copper and includes a 1 mm sapphire 48 at one end for striking disk sample 18 and forming dents in surface 19. Hammer 46 extends from an actuator 45 attached to assembly 44. A steel ball may be substituted for sapphire 48 but magnetic interference will be increased, therefore, sapphire 48 is preferred. Assembly 44 is of a construction sufficient to be moved in three axes 44a, b, c as illustrated in FIG. 2 for specifically locating sapphire 48 relative to disk sample 18. Hammer 46 weighs about 0.16 grams and is actuated electromagnetically to impart impact intensities ranging from $3 \times 10^{-6}$ to $1.5 \times 10^{-4}$ Kgf-sec on a predetermined location of surface 19 which is either held stationary or rotating at a surface speed up to about 50 meters/second. The impact intensity is controlled by the hammer mass, impact velocity, hammer-to-disk spacing and disk speed so that at the lowest intensity, the disk surface 19 is not permanently deformed. Whereas at the highest intensity, the deformation penetrates several microns into the substrate. There exists a threshold impact intensity at which one-half of the roughness of the disk surface 19 is permanently deformed in a single impact. It is possible to determine other threshold impact intensity on the basis of fatigue or recording performance. The motion of hammer 46 is measured with proximity sensor in the calibration prior to the test. The hammer-to-disk spacing is set at 60% of the full travel of the hammer. The hammer velocity is constant over the middle third of its full travel, FIG. 4. This permits the use of a micrometer with positioning accurancy of $\pm 2.54 \times 10^{-3}$ cm and makes the setting of the hammer-to-disk spacing less critical. The full travel of the hammer 46 varies in the range of 0.025 to 1 cm depending on the impact intensity. To simulate a situation closer to the real case, the recording head with its suspension system may be used instead of the hammer. Additional parameters such as slider angles of attack and roll must be monitored.

The wear is evaluated by measuring the geometry of the permanent deformation of the disk surface 19, by observing the magnetic recording performance and by translating the data in terms of stress/strain, electromagnetic and air bearing characteristics at the slider/disk interface. Assembly 44 is coupled to be actuated by hammer drive circuit 38 in module 32.

Head assembly 56 is similarly preferably of aluminum and is coupled to control portion 16b. Also, head assembly 56 includes a 0–1 inch micrometer 58 to place a slider 60 at a desired position on disk sample 18. Slider 60 is supported by a flexure and load spring. Slider 60 has an air bearing surface of 1.5 mm long and 0.6 mm wide, and has a 1.4 micron long read/write gap located at the center of its length. The same slider 60 is used to read, write and erase. The slider material is Mn-Zn ferrite and is of the taper-flat type design. The write frequency can be varied from 1 to 8 MHz, and the write current can be set from 9 to 96 mA via control portion 16b. Since the test medium saturates at about 60 mA, this value was used in the tests discussed below.

An oscilloscope 62 is coupled to receive a read back signal from read/write/erase circuit 28 of control portion 16b. This signal to oscilloscope 62 is examined with respect to changes in readback amplitude and wave form due to the impacts of hammer 46. Also, slider flying dynamics can be examined from the readback signal envelope. Preferably a pulse generator 61 is coupled to read/write/erase circuit 28 for varying the frequency of the readback signal received by oscilloscope 62.

TEST PROCEDURES

Before installing the test disk 18 on the drive, a series of static impacts with intensity ranging from the lowest to the highest are imposed to create dents in the unused area of the disk 18. The dents are then analyzed with a stylus type surface analyzer, and the correlation between the geometrical parameters and the impact intensity is established.

Next, a suitable unworn area of the disk surface 19 is selected. Its angular and radial position referenced to timing marker 24 placed on the disk edge 25 is determined. A test recording pattern is written in the selected area in which the magnetic flux direction changes alternatively at selected frequency. The readback signal is examined by the oscilloscope 62 display and photographically recorded for comparison with the subsequent readback signal to be recorded when the dents are made. The envelope of the readback signal of the entire disk revolution, the expanded segment of the envelope in the neighborhood of the dents, and the individual pulses at the expected location of the dents can be examined. The readback signal can be monitored and recorded continuously to see its changes with respect to time. Erasing and rewriting at the same location is done to see if the read/write characteristic has changed. The above examination of the readback signal establishes the necessary references for comparison with that obtained after the hammer 46 impact.

In the selected area of the stationary disk 18 the hammer 46 positioning micrometers 50, 52, 54 are used to locate 6 circular dents along a radial line by 6 impacts of the hammer 46 with the identical impact intensity. Thereafter, the disk 18 is rotated at 6000 rpm; and then, using the slider positioning micrometer 58, the slider 60 is used to locate the dents by repeating the positioning, write, read, and erase (PWRE) operation while observing the oscilloscope 62 display of the envelope of the readback signal. When the slider 60 is positioned directly over the test area, corresponding to the impacted angular position there is a notch on the envelope.

The depth of the notch increases and then decreases as the slider 60 traverses across the dents in a series of small increments while the PWRE sequence is repeated at each step. In this way the slider and hammer micrometers 58, 50, 52, 54 are correlated. Once the slider and hammer micrometers 58, 50, 52, 54 are correlated, it can be used to select any other test track.

A simple timing delay circuit 36 is used to adjust the hammer drive current pulse with respect to the timing marker on the disk edge 25 so that the impact can be landed at the desired angular position of the test track.

In the static impact test several angular positions of the same test track are used to evaluate various test patterns. The patterns are generated by varying the number of impacts along the same radial line, the spacing pitch between the impacts, and the impact intensity.

In the dynamic impact test, only a single impact of above threshold intensity is made at the selected angular and radial position. Three milliseconds after the hammer impact, the readback signal can be recorded periodically.

TEST RESULTS

Static Tests

Figure 5:
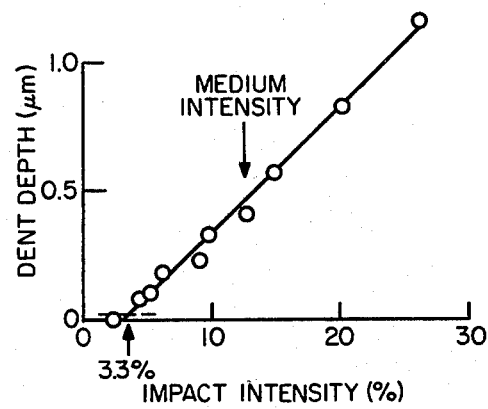
FIG. 5 is a graphic illustration of dent depth vs. impact intensity.

The correlation between the geometrical parameter, dent depth, and the impact intensity at zero disk speed is shown in FIG. 5. The static threshold impact intensity at which one-half of the roughness of the disk surface 19 is permanently deformed in a single impact is determined to be 3.3% of $1.5 \times 10^{-4}$ Kgf-sec. The corresponding interface stresses estimated [2] are: peak compressive force $=0.20$ kfg, Hertz peak pressure$=280$ Kgf/mm$^2$, uniaxial tensile yield stress$=167$ Kfg/mm$^2$, shear yield stress$=87$ Kgf/mm$^2$, elastic approach$=0.66$ microns, radius of contact circle$=18$ microns, and total contact duration$=25$ micro seconds.

Figure 6A:
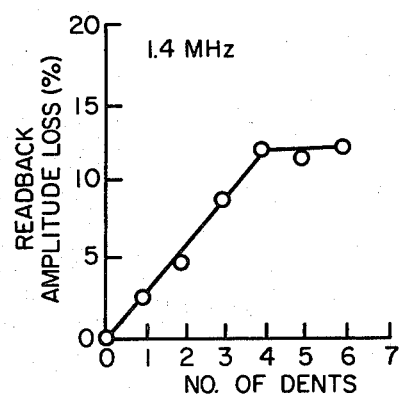
FIGS. 6a and 6b are graphic illustrations of readback amplitude loss vs. number of dents and a surfanalyzer trace of dent profile.
Figure 6B:
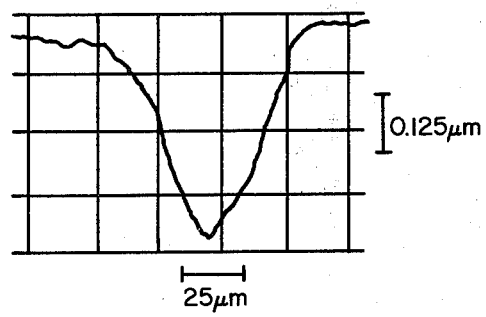

From the static impact test results, the loss of the read-back signal amplitude is plotted against the number of dents in FIG. 6a. The spacing pitch is kept constant at 0.127 mm. The loss of the readback signal amplitude increases linearly with the number of dents. The surface analyzer trace along the center line of one of the dents is shown in FIG. 6b. In terms of wear, this may resemble the cross section of the grooves produced by several abrasive particles pressed against the disk 18 at the interface. The magnetic thin film is compressed during the impact at this intensity; however, it has not been removed from the disk 18.

Figure 7:
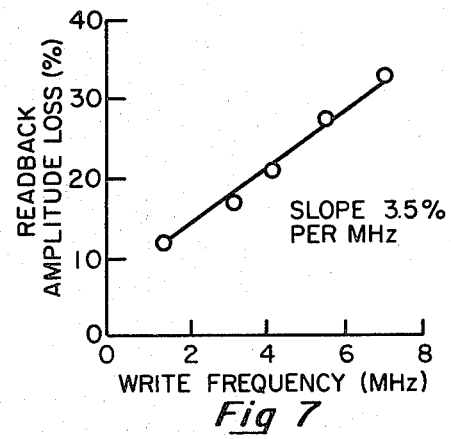
FIG. 7 is a graphic illustration of readback amplitude loss vs. write frequency.

When the spacing pitch of the dents is reduced, the dents are packed closer together. The dents form a continuous flatbottom groove. The loss of the readback signal amplitude, FIG. 7, is increased significantly more than the case of FIG. 6a. The relationship remains linear.

Figure 8:
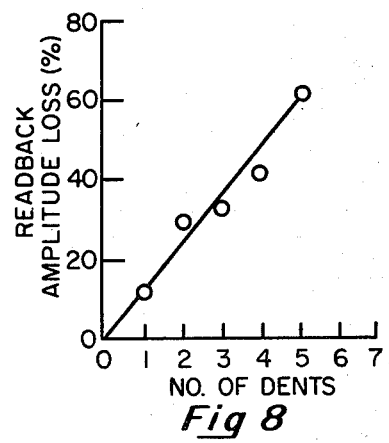
FIG. 8 is a graphic illustration of readback amplitude loss vs. number of dents.

When the recording frequency is varied, the amplitude loss of the readback signal is changed, FIG. 8.

Figure 9:
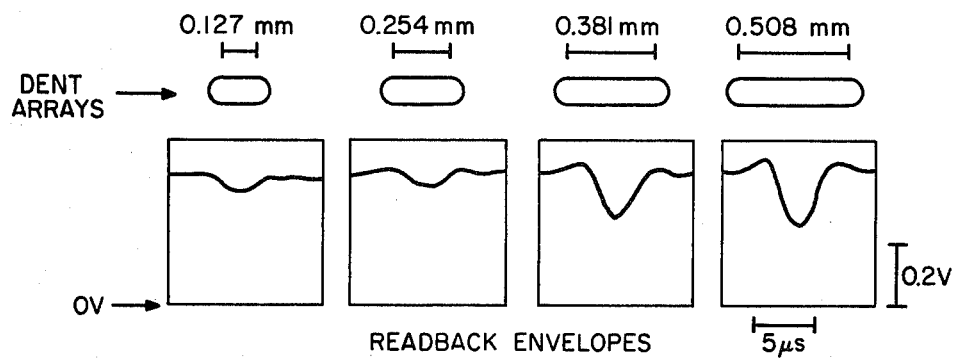
FIG. 9 illustrates four arrays of dents and corresponding oscillographic readback envelopes.

In general, the impact wear at the head/disk interface can be simulated with three types of controlled impact patterns. They are (a) the single impact dent of various size and depth, (b) a chain of non-overlapping dents, and (c) a chain of overlapping dents. The typical readback signal envelope disturbance caused by Type (c) is shown in FIG. 9.

Figure 10:
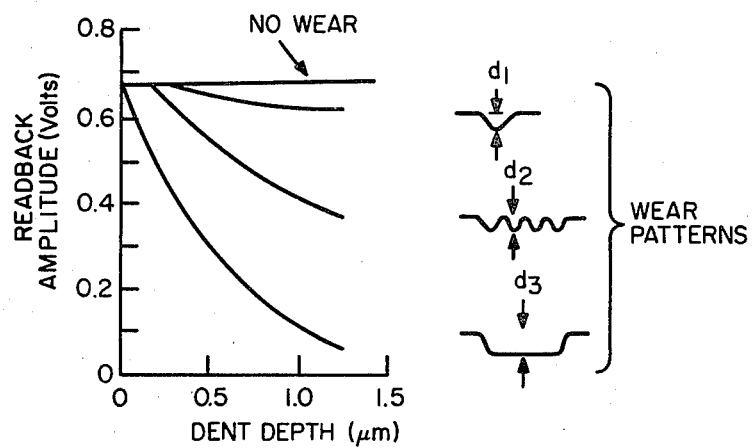
FIG. 10 is a graphic illustration of readback amplitude vs. dent depth.

FIG. 10 shows the dependence of the readback amplitude on the dent depth $d_1$, $d_2$ and $d_3$. The threshold impact dent depth below which the readback amplitude is not affected, is shown to be $d_1 = 0.2$ microns, $d_2 = 0.1$ microns and $d_3 = 0$. The readback amplitude reduction depends significantly on the three patterns and dent depth.

Dynamic Tests

Figures 11A, 11B:
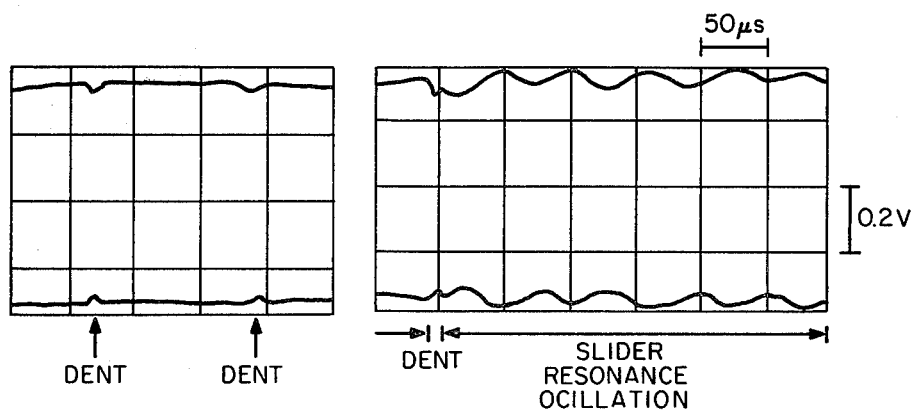
FIGS. 11a and 11b illustrates disturbed segments of the envelope of an oscillographic readback signal.

From the dynamic test results, several interesting features of the readback envelope can be observed. In FIG. 11, the oscillographs show the disturbed segments of the envelope of the readback signal. The impact intensity in FIG. 11a is lower than in FIG. 11b; however, both are above the threshold intensity. They leave eyedrop shaped permanent plastic deformation on the disk surface 19. The flying dynamics of the slider 60 are not disturbed by the pair of dents produced by the low intensity impacts in FIG. 11a; however, the slider 60 is set into resonance oscillation whenever it flies over the single dent produced by the high intensity impact in FIG. 11b. Based on the dent size and the disk speed, it is possible to identify in the modulated envelope, as shown in FIG. 11b, the part which is caused by the slider 60 flying over the impact dent and the part which is caused by the slider resonance oscillation.

Figure 12:
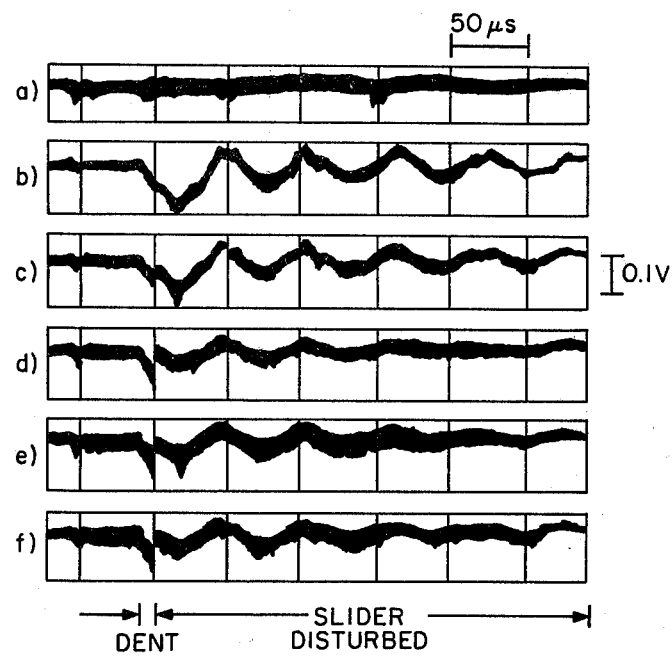
FIG. 12 illustrates transient and steady state oscillographic readback signal envelopes.

The above oscillographs have been recorded at a certain period after the hammer 46 has impacted the disk surface 19. If the time history of the readback signal is recorded as soon as the hammer impact has taken place a set of oscillographs is produced as shown in FIG. 12. The upper part of the envelope of the test segment before the hammer impact is shown in FIG. 12a. Five seconds after the impact the segment of the envelope becomes that shown in FIG. 12b. Subsequent oscillographs show 2,7,15 minutes and 16 hours after the impact. Observation of these oscillographs indicates that the disturbance pattern continues to change from 5 seconds FIG. (12b), 2 minutes FIG. (12c) and up to 7 minutes after impact FIG. (12d). After 7 minutes (FIG. 12e,f) the pattern becomes invariant for as long as 16 hours.

Translating the above data in terms of the magnetic recording, slider flying characteristics and the impact wear between the slider 60 and the rim of the dnet, the results show that the transient elasto-plastic deformation and wear lasts between 2 to 7 minutes, that the frequency of the slider resonance oscillation is 17.85 KHz and it lasts for 500 microseconds, and that the damping ratio of the slider oscillation is 0.0192 for the case shown in FIG. 12. The above results have demonstrated the feasibility of evaluating the mechanical deformation and wear transient by means of magnetic recording.

The foregoing has described apparatus, test procedures and test results for measuring and characterizing slider/disk wear.

It is anticipated that aspects of the present invention, other than those specifically defined in the appended claims, can be obtained from the foregoing description and the drawings.

Having thus described the invention, what is claimed is:

1. A test apparatus comprising:
    a memory disk sample;
    a disk drive supporting said sample;
    a head assembly mounted adjacent said disk sample, said head assembly having a slider head in proximity with said disk sample;
    a hammer assembly mounted adjacent said disk sample, said hammer assembly having a hammer movable into engagement with said disk sample; and
    means for controlling said hammer for making predetermined dents in said disk sample.

2. The apparatus of claim 1 wherein said means for controlling said hammer includes a read/write/erase circuit.

3. The apparatus of claim 2, including:
    means coupled for receiving a readback signal from said read/write/erase circuit and for displaying an envelope associated with said signal.

4. The apparatus of claim 1 wherein said slider is positionable relative to said disk sample.

5. The apparatus of claim 1 including:
    means on said head assembly for positioning said slider relative to said disk sample, said means being a micrometer.

6. The apparatus of claim 1 wherein said hammer is positionable relative to said disk sample.

7. The apparatus of claim 1 including:

means on said hammer assembly for positioning said hammer relative to said disk sample, said means being a micrometer.

8. The apparatus of claim 1 including:
means on said hammer assembly for positioning said hammer along three axes relative to said disk sample, said means being a micrometer for each of the axes.

9. The apparatus of claim 1 including:
a reflective marker on said disk sample.

10. The apparatus of claim 9 including:
means for reading said marker, said reading means being a photocell.

11. The apparatus of claim 1 including:
a control portion of said disk drive, said control portion having a disk drive circuit, a read/write/erase circuit and a current control circuit.

12. The apparatus of claim 11 including:
a supplementary circuit module having a timing circuit and a hammer drive circuit, said module being coupled to said control portion.

13. The apparatus of claim 12 including:
a photocell coupled to said module.

14. Test apparatus for evaluating flying dynamics of a head slider associated with a magnetic storage disk comprising:
a disk sample having a reflective marker;
means for statically and dynamically supporting said sample;
means for supporting a slider in proximity with said sample;
means for striking said sample and for imposing a dent therein, said means being a hammer supported in proximity with said sample;
means for reading said marker, said reading means being a photocell;
means for controlling said test apparatus, said means having a disk drive circuit, a read/write/erase circuit and a write frequency and current control circuit; and
a supplementary circuit module having a timing circuit and a hammer drive circuit, said module coupled to receive a signal from said photocell, said hammer coupled to said module via said control means.

15. The apparatus of claim 14 including:
means coupled for receiving a readback signal from said read/write/erase circuit and for displaying an envelope associated with said signal.

16. A test apparatus comprising:
a memory disk sample having a reflective marker;
a disk drive having a first portion for retaining said sample, said first portion coupled to a second portion having a disk drive circuit, a read/write/erase circuit and a write frequency and current control circuit;
a supplementary circuit module having a timing circuit and a hammer drive circuit, said module being coupled to said disk drive;
means for reading said marker and for sending a resultant signal to said module, said reading means being a photocell;
a head assembly mounted adjacent said sample, said head assembly having a slider head in proximity with said sample and movable relative thereto; and
a hammer assembly mounted adjacent said disk sample, said hammer assembly having a cantilever beam hammer in proximity with said disk sample and movable relative thereto, said hammer coupled to said module via said disk drive, said hammer movable into engagement with said sample in response to said signal of said photocell.

17. A test apparatus comprising:
a base;
a cooperable cover removable from said base;
a memory disk sample;
a disk drive mounted on said base and supporting said sample;
a head assembly mounted on said base adjacent said disk sample, said head assembly having a slider head in proximity with said disk sample;
a hammer assembly mounted on said base adjacent said disk sample, said hammer assembly having a hammer movable into engagement with said disk sample; and
means for controlling said hammer for making predetermined dents in said disk sample.

* * * * *